US008125968B2

(12) United States Patent
Nylander et al.

(10) Patent No.: US 8,125,968 B2
(45) Date of Patent: Feb. 28, 2012

(54) CHARGING AND LOCATION INDICATIONS IN A GENERIC ACCESS NETWORK

(75) Inventors: Tomas Nylander, Värmdö (SE); Jari Vikberg, Järna (SE); Stefan Engström, Linköping (SE); Tomas Bornefall, Linköping (SE); Henrik Adsersen, Lemvig (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 832 days.

(21) Appl. No.: 12/279,780

(22) PCT Filed: Feb. 24, 2006

(86) PCT No.: PCT/IB2006/000383
§ 371 (c)(1),
(2), (4) Date: Aug. 18, 2008

(87) PCT Pub. No.: WO2007/096685
PCT Pub. Date: Aug. 30, 2007

(65) Prior Publication Data
US 2009/0016274 A1 Jan. 15, 2009

(51) Int. Cl.
*H04Q 7/24* (2006.01)
*H04L 12/28* (2006.01)
(52) U.S. Cl. .................... 370/338; 370/389

(58) Field of Classification Search .............. None
See application file for complete search history.

(56) References Cited

U.S. PATENT DOCUMENTS

| 2005/0124353 A1* | 6/2005 | Cave ............................. 455/453 |
| 2005/0181805 A1* | 8/2005 | Gallagher ................. 455/456.1 |
| 2005/0272449 A1* | 12/2005 | Gallagher et al. ............ 455/458 |
| 2006/0268902 A1* | 11/2006 | Bonner ......................... 370/401 |
| 2006/0276168 A1* | 12/2006 | Fuller et al. ............... 455/404.2 |
| 2007/0008885 A1* | 1/2007 | Bonner ......................... 370/230 |
| 2009/0061879 A9* | 3/2009 | Gallagher et al. ............ 455/439 |
| 2009/0215429 A1* | 8/2009 | Caldwell et al. .............. 455/406 |

* cited by examiner

*Primary Examiner* — Hassan Phillips
*Assistant Examiner* — Eunsook Choi

(57) ABSTRACT

A Generic Access Network Controller (GANC) for providing both location and charging information from a Generic Access Network (GAN) to a core network. During registration of a mobile station (MS) the GANC determines a Charging Cell Global Identity (Charging-CGI) and a Location Cell Global Identity, (Location-CGI) for the MS and stores the CGIs in an MS context. The MS sends to the GANC, a request to establish a signaling connection, and includes an Establishment Cause IE indicating a reason for the connection. The GANC selects from the MS context, either the Charging-CGI or the Location-CGI based upon the Establishment Cause IE, and sends the selected CGI to the core network in a message triggering a signaling connection.

14 Claims, 5 Drawing Sheets

CHARGING AND LOCATION INDICATIONS IN A GENERIC ACCESS NETWORK

TECHNICAL FIELD OF THE INVENTION

The present invention relates to radio telecommunication systems. In particular, and not by way of limitation, the invention is directed to a system and method for providing both location and charging information from a Radio Access Network (RAN) to a Core Network (CN). More specifically, the invention provides both location and charging information from a Generic Access Network (GAN), also known as an Unlicensed Mobile Access Network (UMAN), to a Mobile-services Switching Center (MSC) or Serving GPRS Support Node (SGSN).

DESCRIPTION OF RELATED ART

Unlicensed Mobile Access (UMA) technology utilizes an unlicensed radio band to support mobile telecommunication systems operating in licensed radio bands. For example, the Unlicensed Radio service may support GSM circuit-switched services and GSM Packet Radio Service (GPRS) packet-switched services. Access may be provided over unlicensed spectrum technologies such as Bluetooth or Wireless Local Area Network (WLAN) 802.11.

The unlicensed-radio access network enables MSs to communicate with the core network portion of a conventional mobile communications network, such as a GSM network, via an unlicensed-radio interface. In the description herein, the term "unlicensed-radio" means any radio protocol that does not require a license from an appropriate regulatory body. In general, such unlicensed-radio technologies must be low power and thus of limited range compared to licensed mobile radio services. A benefit of this lower power is that the battery lifetime of mobile stations could be greater. Moreover, because the range is limited, the unlicensed-radio may be a broadband radio, thus possibly providing improved voice quality as well as higher data rates. The radio interface may utilize any suitable unlicensed-radio protocol, for example a wireless LAN protocol, Digital Enhanced Cordless Telecommunications (DECT), or Bluetooth radio.

The GAN includes a GAN Controller (GANC), which connects to an MSC using an A-interface, or to an SGSN using a Gb-interface. The GAN also includes Access Points (APs), which normally provide IP-connectivity using unlicensed radio access technologies, such as IEEE 802.11 (WiFi) and Bluetooth. Mobile stations (MSs) operating in this environment include two separate radios. The first radio is used for communications in the GMS EDGE Radio Access Network (GERAN) and/or Universal Mobile Telecommunications System (UMTS) Terrestrial Radio Access Network (UTRAN) using licensed radio frequencies. The second radio is used for communications in the GAN using unlicensed radio frequencies.

The communication between the MS and the GANC is provided using IP networks and protocols. Each AP provides local IP-connectivity used by the MS to connect to the GANC. Since IP networks and protocols are used, the MS can connect to almost any GANC in the network. However, the network controls which GANC the MS connects to, and is able to redirect the MS to another GANC.

A Cell Global Identity (CGI) includes a Location Area Identity (LAI) and a Cell Identity (CI). Furthermore, the LAI includes a Mobile County Code (MCC), a Mobile Network Code (MNC), and a Location Area Code (LAC).

When the MS connects (registers) with a GANC, it identifies itself using the MS's International Mobile Subscriber Identity (IMSI) and reports certain information including the overlaying radio access network (i.e. GERAN or UTRAN) cell where the MS is located, if available, and an AP identifier (AP-ID) of the current AP the MS is using. The AP-ID could be for example the MAC-address of a WiFi AP or the Bluetooth Device Address of a Bluetooth AP. A GERAN cell is identified using the CGI, and a UTRAN cell is identified using the LAI and a 3G Cell Identity. For simplicity, the description herein uses the term GERAN-CGI for the CGI reported by the MS to the GANC as part of registration. This should be understood to also mean the UTRAN LAI and 3G Cell Identity for the case when the MS registers from a UTRAN cell.

The GANC is allocated a number of CGIs that it returns to registering MSs in the GAN system information. These so-called GAN-CGIs are also indicated towards the CN (both to the MSC and the SGSN). However, only one GAN-CGI is returned for a specific MS, and is also indicated towards the CN for this specific MS.

The GAN-CGI may provide either location information or charging information to the MSC. The location information provided from the GAN to the MSC may be used, for example, for routing to a correct emergency center (referred to as a Public Safety Answering Point, PSAP, in the US). An emergency call should be routed to the correct PSAP, which may be, for example, the local PSAP in the same city where the calling MS is located. The actual information transmitted and indicated from the GANC to the MSC is the GAN-CGI allocated to the calling MS. The GANC includes the GAN-CGI in the initial message towards the MSC when a signaling connection for the emergency call is being established. The message used is part of the Base Station System Management Application Part (BSSMAP) protocol and is called the COMPLETE LAYER 3 INFORMATION message.

The charging information provided from the GAN to the MSC can be used to differentiate between a GAN access and a GERAN/UTRAN access and also different types of APs being used. For example the following levels could be applied:

The MS is in a GAN (i.e., just an indication that the MS is using GAN access); or The MS is using Home AP, Public Hotspot with free calls, or Public Hotspot with low tariff.

The actual information transmitted from the GANC to the MSC for charging information is also the CGI.

FIG. 1 is a signaling diagram illustrating existing procedures for registration, a normal call, and an emergency call by an MS operating in a GAN. The MS 11 is connected through an AP 12 to a GANC 13. The GANC connects to an MSC 14 through a standard A-interface. Referring first to the registration procedure, at step 15, the MS is initially camped on a GERAN-cell when the MS finds a compatible AP that the MS is allowed to use. The MS connects to the AP using the unlicensed radio access technology and gains IP-connectivity.

The MS 11 then initiates the establishment of an IPsec tunnel (not shown) towards a Security Gateway, SEGW, part of the GANC 13 in accordance with GAN specifications 3GPP TS 43.318 and 44.318, which are incorporated herein by reference. This could be a Provisioning GANC, a Default GANC, or a Serving GANC depending on the previous procedures performed by the MS. When the IPsec tunnel is successfully established, the MS attempts registration towards the GANC. At step 16, the MS provides its GERAN- CGI, AP-ID, and IMSI among other information to the GANC as part of the registration.

At step 17, the GANC 13 selects one GAN-CGI for the MS 11 based on received information from the MS and also configured information. This selection can be based on factors such as the combination of the IMSI and the AP-ID to find out if a 'Home-AP' is being used. The selected GAN-CGI would then be used to derive the tariff in the MSC (or in an SGSN or GGSN in the PS domain). In this example, the GANC accepts the registration and at step 18, and returns the GAN-CGI to the MS as part of the GAN system information. The GANC also creates a local MS context that is maintained as long as the MS is registered to the GANC. The selected GAN-CGI is associated with the specific MS context.

Referring next to the normal call procedure, the MS 11 initiates the procedure at step 19 by establishing a signaling connection (i.e., a Generic Access-Circuit Switched Resources (GA-CSR) connection) towards the GANC 13. The MS includes an Establishment Cause information element (IE) in its request for the signaling connection. If the GANC accepts the GA-CSR connection and indicates this to the MS, the MS sends the initial upper layer message to the GANC. At step 20, the GANC checks the stored MS context to obtain the GAN-CGI for this MS and initiates the signaling connection towards the MSC 14. The GANC sends the COMPLETE LAYER 3 INFORMATION message to the MSC and includes the GAN-CGI in the BSSMAP COMPLETE LAYER 3 INFORMATION. At step 21, the MSC uses the received GAN-CGI for charging purposes.

Referring next to the emergency call procedure, the MS 11 initiates the procedure at step 22 by establishing a signaling connection towards the GANC 13. The MS includes the Establishment Cause IE in its request for the signaling connection. If the GANC accepts the GA-CSR connection and indicates this to the MS, the MS sends the initial upper layer message to the GANC. At step 23, the GANC checks the stored MS context to obtain the GAN-CGI for this MS and initiates the signaling connection towards the MSC 14. The GANC sends the COMPLETE LAYER 3 INFORMATION message to the MSC and includes the GAN-CGI in the BSSMAP COMPLETE LAYER 3 INFORMATION. At step 24, the MSC uses the received GAN-CGI for location-based services, in this case, PSAP routing.

A problem with the existing procedures is that they do not provide the ability to indicate both location and charging information for one MS towards the MSC, and both indications are needed. The location indication is mandatory for emergency calls and the charging indication is needed for normal calls and transactions such as Short Message Service (SMS) signaling.

It would be advantageous to have a system and method that overcomes the disadvantages of the existing procedures by providing both location and charging information for one MS towards the MSC. The present invention provides such a system and method using 3GPP Release 6 standard interfaces thus requiring minimal changes in the CN.

SUMMARY OF THE INVENTION

The present invention is a system and method for providing both location and charging information from a Radio Access Network (RAN) to a Core Network (CN). In the embodiment described herein, the invention is specifically directed to a system and method for providing both location and charging information from a Generic Access Network (GAN), also known as Unlicensed Mobile Access (UMA), to a Mobile-services Switching Center (MSC) or Serving GPRS Support Node (SGSN).

Thus in one aspect, the present invention is directed to a method of providing both location and charging information from a GAN to a core network. The method includes determining by a GAN controller (GANC), a Charging Cell Global Identity (Charging-CGI) and a Location Cell Global Identity (Location-CGI) for a mobile station registering with the GANC, wherein the Charging-CGI provides charging information required for proper charging of a transaction by a mobile station, and the Location-CGI provides location information required, for example, for location-based services or routing of an emergency call from the mobile station to an emergency center. The method also includes storing the Charging-CGI and the Location-CGI in a mobile station context; and receiving from the mobile station, a request to establish a signaling connection, wherein the request includes an indication of a reason for the connection. The GANC then selects from the mobile station context, either the Charging-CGI or the Location-CGI based upon the reason for the connection, and sends the selected CGI to the core network in a message triggering a signaling connection.

In another aspect, the present invention is directed to a GANC for providing both location and charging information from a GAN to a core network. The GANC includes means for determining a Charging-CGI and a different Location-CGI for a mobile station registering with the GANC, and means for storing the Charging-CGI and the Location-CGI in a mobile station context. The GANC also includes means for receiving from the mobile station, a request to establish a signaling connection, wherein the request includes an indication of a reason for the connection. The GANC also includes means for selecting from the mobile station context, either the Charging-CGI or the Location-CGI based upon the reason for the connection; and means for sending the selected CGI to the core network in a message triggering a signaling connection.

In yet another aspect, the present invention is directed to a method of providing both location and charging information from a GAN to a core network. The method includes determining by a GANC, a Charging-CGI and a Location-CGI for a mobile station registering with the GANC, wherein the Charging-CGI provides charging information required for proper charging of a transaction by a mobile station, and the Location-CGI provides location information required for location-based services or routing of an emergency call from the mobile station to an emergency center. The method also includes storing the Charging-CGI and the Location-CGI in a mobile station-context; receiving from the mobile station, a request to establish a signaling connection; retrieving the Charging-CGI from the mobile station context; and sending the Charging-CGI to the core network in a message triggering a signaling connection. Thereafter, upon determining that a service requiring location information on the CGI level is being activated for the mobile station, the GANC retrieves the Location-CGI from the mobile station context and sends the Location-CGI to the core network.

In yet another aspect, the present invention is directed to a method of generating both location and charging information in a GANC. The method includes receiving by the GANC, an invoke trace message from a core network that instructs the GANC to begin producing a trace record on an identified mobile station. The GANC then determines a Charging-CGI and a Location-CGI for the identified mobile station, wherein the Charging-CGI provides charging information required for proper charging of a transaction by the mobile station, and the Location-CGI provides location information for the mobile station. The GANC may store or print out the Charging-CGI and Location-CGI in a local trace, or may send the trace to an Operational Support System (OSS).

DETAILED DESCRIPTION OF EMBODIMENTS

In the present invention, when the MS registers with the GANC, two different CGIs (a Location-CGI and a Charging-CGI) are selected for the MS and are associated with the MS context. The Location-CGI is used for location-based indications towards the CN, and the Charging-CGI is used for charging indications towards the CN.

Furthermore, when the MS initiates signaling connections towards the MSC, the GANC checks the Establishment Cause for the signaling connection as indicated by the MS and chooses the relevant CGI depending on the Establishment Cause. The chosen CGI is provided to the MSC when the signaling connection between the GANC and the MSC for this MS is established.

Figure 1:
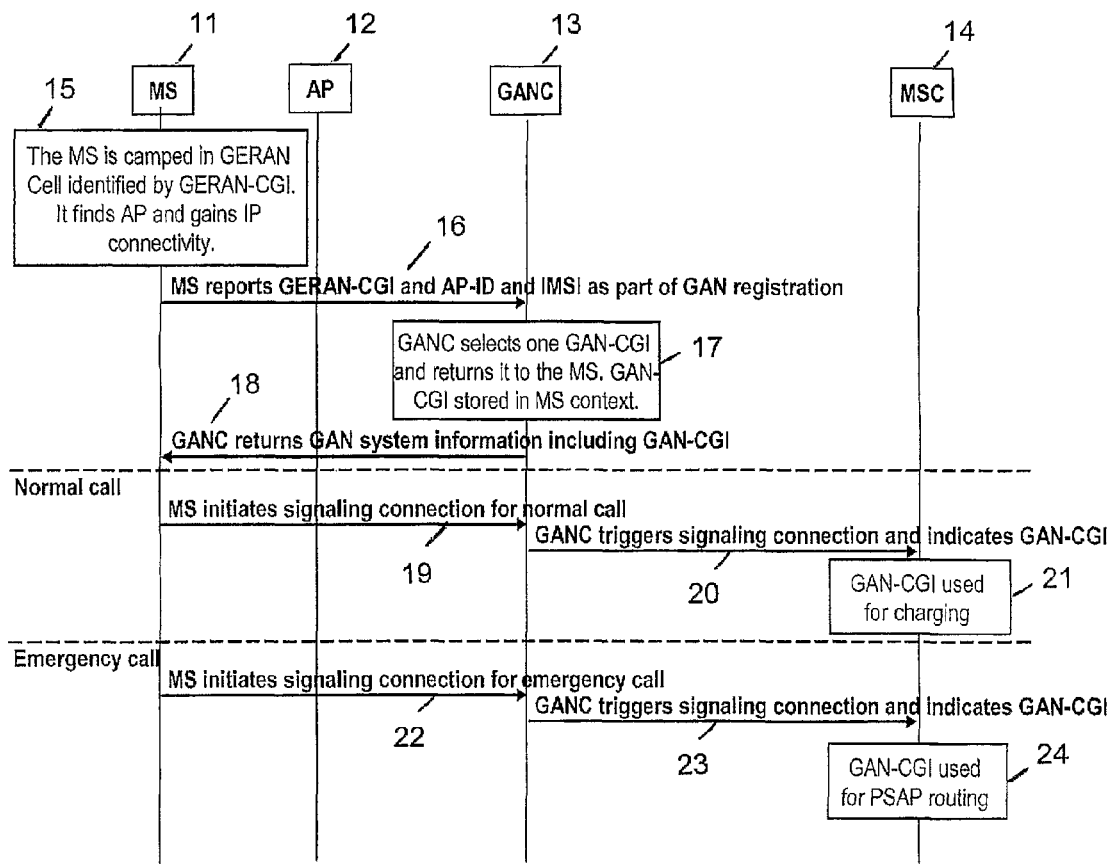
FIG. 1 is a signaling diagram illustrating existing procedures for registration, a normal call, and an emergency call by an MS operating in a Generic Access Network (GAN)
Figure 2:
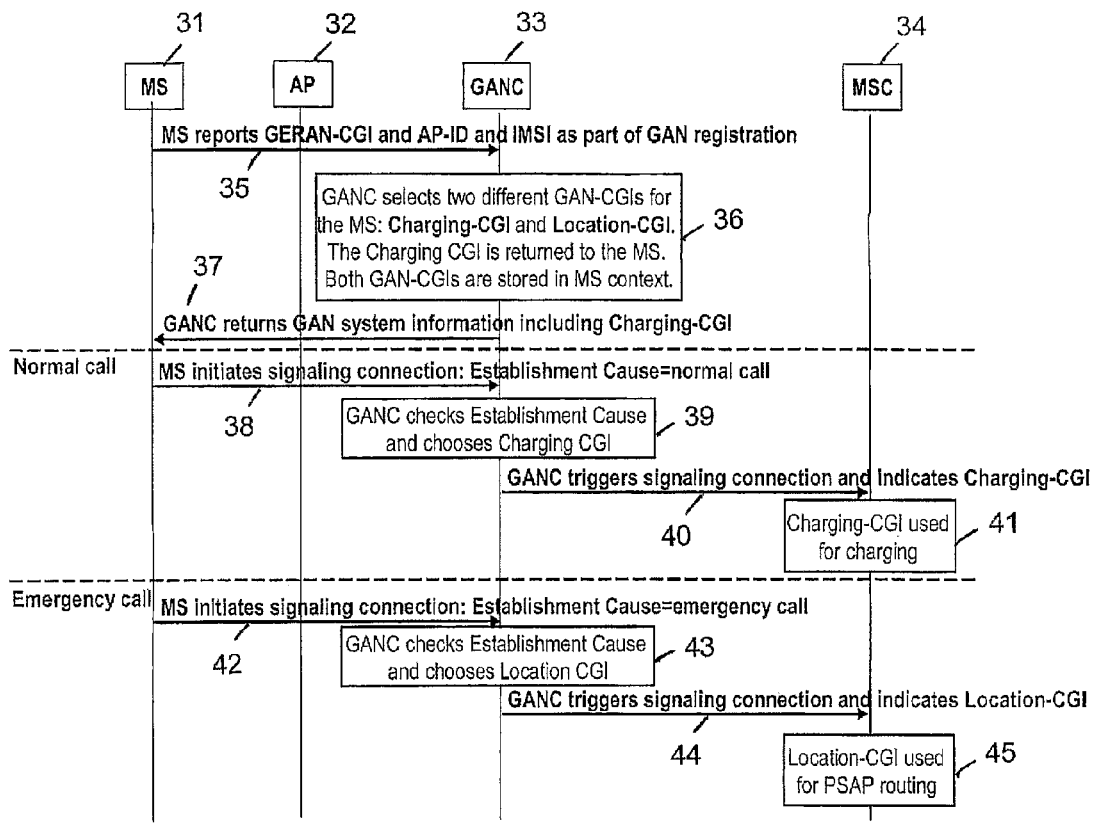
FIG. 2 is a signaling diagram illustrating procedures for registration, a normal call, and an emergency call by an MS operating in a GAN in a first exemplary embodiment of the present invention.

FIG. 2 is a signaling diagram illustrating procedures for registration, a normal call, and an emergency call by an MS operating in a GAN in a first exemplary embodiment of the present invention. The MS 31 is connected through an AP 32 to a GANC 33. The GANC connects to an MSC 34 through a standard A-interface. Referring first to the registration procedure after an IPsec tunnel is successfully established, the MS attempts registration towards the GANC at step 35. The MS provides its GERAN-CGI, AP-ID, and IMSI among other information to the GANC as part of the registration.

At step 36, the GANC 33 receives the GAN registration request from the MS 31, and determines two different CGIs for the MS. The CGIs are referred to as the Charging-CGI and the Location-CGI. The principles for determining these CGIs are further described below in connection with FIG. 3. In the example illustrated in FIG. 2, the GANC accepts the registration and at step 37, returns the Charging-CGI to the MS as part of the GAN system information. The GANC also creates a local MS context that is maintained as long as the MS is registered with the GANC. The Charging-CGI and the Location-CGI are stored in the MS context and are maintained as long as the MS is registered with the GAN.

Referring next to the normal call procedure, the MS 31 initiates the procedure at step 38 by establishing a signaling connection towards the GANC 33. The MS sets the Establishment Cause IE for the signaling connection equal to one of the non-emergency values and sends the initial upper layer message to the GANC. The non-emergency Establishment Cause value, referred to herein as "Normal (call)", may indicate for example a variant of a paging response, any other signaling channel procedures, or any of the cause values allocated for mobile originating transactions as defined in the GAN specifications.

At step 39, the GANC checks the Establishment Cause to find out which of the selected CGIs to use for this call, and chooses the Charging-CGI because the Establishment Cause IE is set to a non-emergency value. At step 40, the GANC initiates the signaling connection towards the MSC 34 and includes the Charging-CGI in a (BSSMAP) COMPLETE LAYER 3 INFORMATION message. At step 41, the MSC uses the received Charging-CGI for charging purposes.

Referring next to the emergency call procedure, the MS 31 initiates the procedure at step 42 by establishing a signaling connection towards the GANC 33. The MS sets the Establishment Cause IE=Emergency (call) for the signaling connection and sends the initial upper layer message to the GANC. At step 43, the GANC checks the Establishment Cause to find out which of the selected CGIs to use for this call, and chooses the Location-CGI because the Establishment Cause IE=Emergency (call). At step 44, the GANC initiates the signaling connection towards the MSC 34 and includes the Location-CGI in the (BSSMAP) COMPLETE LAYER 3 INFORMATION message. At step 45, the MSC may utilize the received Location-CGI for location-based services such as PSAP routing.

Thus, when the GANC 33 receives a signaling connection establishment from an MS 31, it uses the received Establishment Cause value to select one of the CGIs stored in the context for this MS. The selected CGI is then indicated towards the MSC 34. This process is further described below in connection with FIG. 4.

Figure 3:
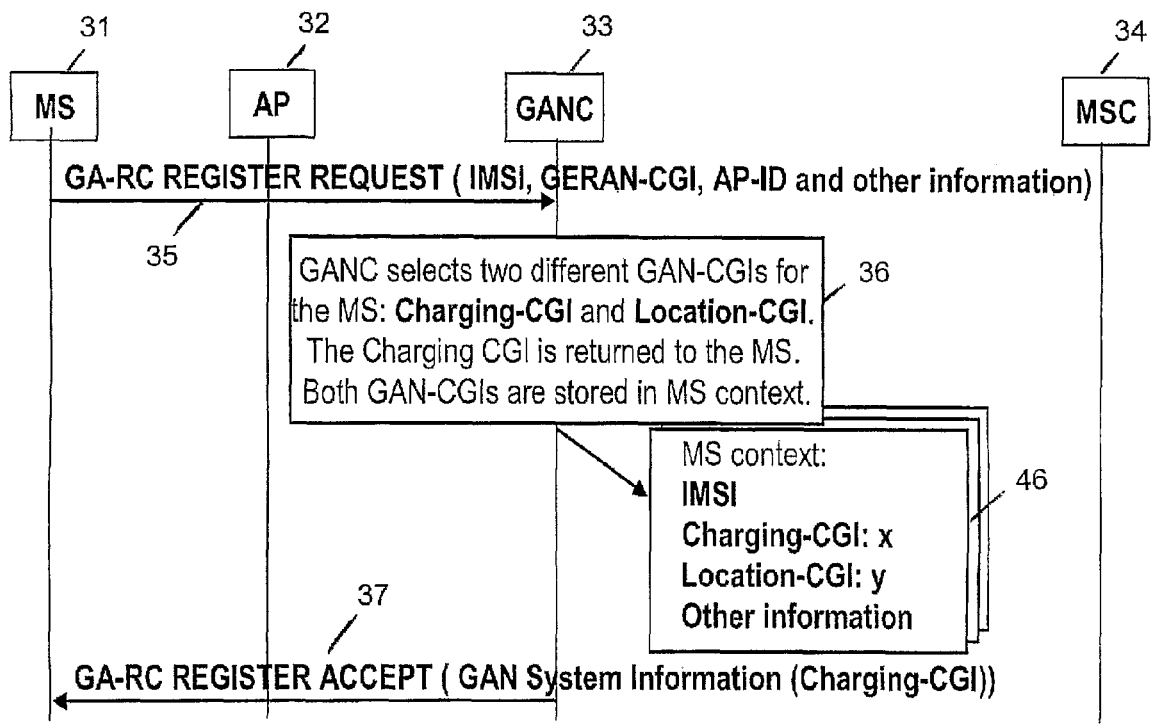
FIG. 3 is a signaling diagram illustrating more detailed procedures in the GANC for determining a Charging-CGI and a Location-CGI.

FIG. 3 is a signaling diagram illustrating more detailed procedures for determining the Charging-CGI and the Location-CGI in the GANC 33. At step 35, the MS 31 sends a GA-RC REGISTER REQUEST message to the GANC 33 and includes information such as the IMSI, GERAN-CGI, AP-ID, and other information. At step 36, the GANC analyzes the received information together with preconfigured information available in the GANC. The preconfigured information may be stored in the GANC or in a separate node/database accessible from the GANC. Note that the GERAN-CGI is actually received as two different information elements: Location Area Identity (LAI) and GERAN Cell Identity (CI). In some cases, the LAI and 3G Cell Identity is received instead of the GERAN-CGI.

If the GANC 33 decides to accept the registration, an MS context 46 is created for the MS and maintained as long as the MS is registered with the GANC. When the MS context has been created, the GANC may determine the Charging-CGI and the Location-CGI in the following manner. Note that these procedures are exemplary only, and other combinations of received or preconfigured information may be used to determine the different CGIs.

In the example illustrated in FIG. 3, the GANC accepts the registration and at step 37, returns the Charging-CGI to the MS as part of the GAN system information. The Charging-CGI determination is based on information that can be used for different charging indications. The following are examples of the types of information that the GANC may utilize to determine the Charging-CGI.

IMSI

The IMSI alone may be used to determine the Charging-CGI, for example, when specific end users (MSs) have the same tariff whenever they are using the GAN (regardless of the location or the AP being utilized).

IMSI and AP-ID

The IMSI and the AP-ID may be used to determine the Charging-CGI, for example, when different tariffs are applied for different end users depending on the AP being utilized. The AP-ID identifies the AP being utilized, and different relations (Home AP, Hotspot AP, etc.) may be defined between MSs and APs in the GANC. The determined Charging-CGI then indicates the relation between the MS and the AP being used.

IMSI and GERAN-CGI (or Parts Thereof)

The IMSI and the GERAN-CGI (or parts thereof may also be used to determine the Charging-CGI, for example, when specific end users (MSs) have the same tariff whenever they are using the GAN in a specific geographical location. The GERAN-CGI indicates the country, the mobile network, the location area, and the cell the MS is currently utilizing. Again, different relations may be defined between MSs and the country, the mobile network, the location area, or the cell in the GANC. The determined Charging-CGI then indicates the specific tariff to be applied for this MS in that geographical area.

IMSI, GERAN-CGI and GERAN/UTRAN Coverage Indicator

The received IMSI and GERAN-CGI (or parts thereof) may also be utilized together with the received GERAN/UTRAN Coverage Indicator. The GERAN/UTRAN Coverage Indicator defines the service state for the received GERAN-CGI (or only the LAI, or nothing received in some cases). The service state is indicative of the type of the received GERAN-CGI.

Any combination of the above information as reported by the MS and/or preconfigured in the GANC may be utilized to determine the Charging-CGI.

The Location-CGI determination is based on information that can be used to indicate the current location of the MS. The following are examples of the types of information that the GANC may utilize to determine the Location-CGI.

GERAN-CGI (or Parts Thereof)

The GERAN-CGI is reported by the MS, and the GERAN-CGI or parts thereof (country, mobile network, location area, or cell) may be used to determine the Location-CGI. The determined Location-CGI then indicates the specific geographical area. In some cases, the GERAN-CGI may also be utilized as the Location-CGI.

GERAN-CGI and GERAN/UTRAN Coverage Indicator

As in the previous example, the received: GERAN-CGI (or parts thereof) may be used together with the received GERAN/UTRAN Coverage Indicator to determine the Location-CGI. The GERAN/UTRAN Coverage Indicator defines the service state for the received GERAN-CGI (or only LAI, or nothing received in some cases). The service state is indicative of the location validity of the received GERAN-CGI. The MS may send a stored LAI when there is no macro RAN service available. This stored LAI may have been measured at a different location.

AP-ID

The GANC may also have preconfigured information about the location of an AP. In this case, the Location-CGI may be determined based on the AP-ID received.

Public IP-Address

The GANC may also have preconfigured information about the location of an IP-address. In this case the Location-CGI may be determined based on the Public IP-address that the GANC (actually the GANC-SEGW part of the GANC) sees when the MSs are establishing the IPsec tunnels. The MS IP-address used to establish the IPsec tunnel to the SEGW is called Public IP-address in GAN terminology. This Public IP-address could also be a private IP-address as reserved in IETF, such as subnetworks 10.x.x.x and 192.168.x.x.

Geographic Location

The MS may also indicate its current location in coordinates (i.e., longitude and latitude). This information may also be used to determine the Location-CGI.

AP Location

The MS may also indicate the civic address (i.e., a street address) of the AP. This information may also be used to determine a Location-CGI.

Any combination of the above information as reported by the MS and/or preconfigured in the GANC may be used to determine the Location-CGI.

Figure 4:
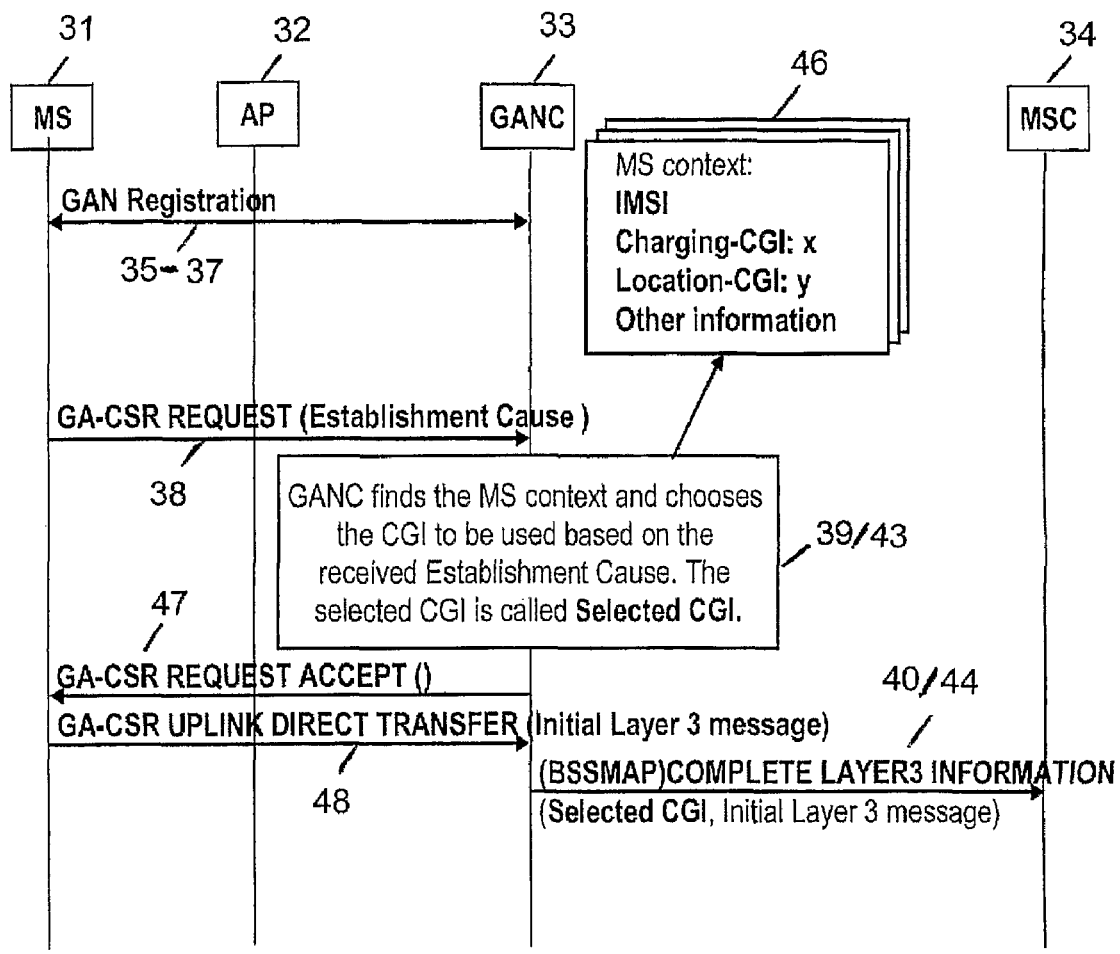
FIG. 4 is a signaling diagram illustrating more detailed procedures in the GANC for choosing either the Charging-CGI or the Location-CGI when the MS initiates a signaling connection.

FIG. 4 is a signaling diagram illustrating more detailed procedures in the GANC 33 for choosing either the Charging-CGI or the Location-CGI when the MS 31 initiates a signaling connection. The MS has previously registered with the GANC at steps 35-37 as previously shown in FIGS. 2 and 3. In this process, the GANC has created the MS context 46 and has determined the Charging and Location CGIs for the MS as described in connection with FIG. 3.

The MS 31 requests the establishment of the signaling connection by sending a GA-CSR REQUEST message 38 to the GANC 33. The MS includes the reason for the establishment request in the Establishment Cause IE. When the GANC receives the GA-CSR REQUEST message, the GANC finds the associated MS context 46 and selects the type of CGI to be indicated to the MSC 34 for this signaling connection. As shown in steps 39 and 43 of FIG. 2, if the Establishment Cause IE indicates "Emergency (call)" the Location-CGI is selected. Otherwise, the Charging-CGI is selected. The CGI thus selected becomes the "Selected CGI".

The GANC 33 then sends a GA-CSR REQUEST ACCEPT message 47 to the MS 31. The MS then sends the initial layer 3 message (e.g., a CM Service Request) to the GANC in a GA-CSR UPLINK DIRECT TRANSFER message 48. When the GANC receives this message, it takes the included initial Layer 3 message and the Selected CGI and uses these to build a (BSSMAP) COMPLETE LAYER 3 INFORMATION message 40/44 (as shown in FIG. 2) that the GANC then sends to the MSC 34. This message may be included in the SCCP CR (Connection Request) message used to establish the SCCP-part of the signaling connection. When the MSC receives the (BSSMAP) COMPLETE LAYER 3 INFORMATION message, the MSC uses the included Selected CGI for either PSAP routing or charging depending on information in the attached initial Layer 3 message.

The differentiation between the Location-CGI and the Charging-CGI may also be applied to the packet-switched (PS) domain in which the Selected CGI is indicated from the GANC towards an SGSN. It should be noted that a principal difference for the PS domain is that only one CGI can be used for all uplink messages associated with one MS because there is no concept corresponding to Establishment Cause for the PS domain. Therefore, either the Charging-CGI or the Location-CGI must be utilized, and normally this would be the Charging-CGI.

Figure 5:
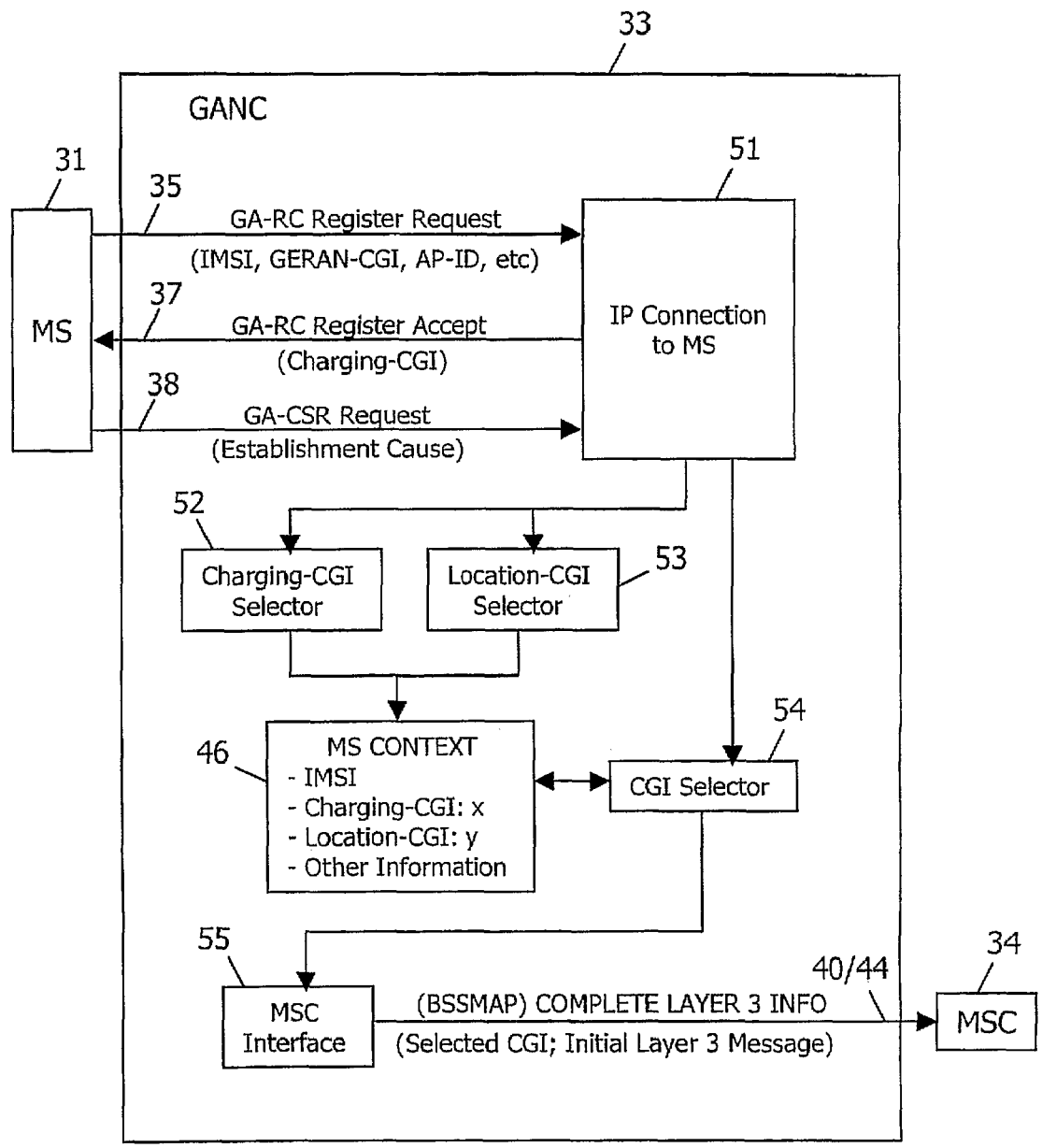
FIG. 5 is a simplified block diagram of a GANC modified in accordance with an exemplary embodiment of the present invention.

FIG. 5 is a simplified block diagram of a GANC 33 modified in accordance with an exemplary embodiment of the present invention. When initiated by the MS 31, the GANC establishes a TCP/IP connection 51 with the MS and receives the GA-RC REGISTER REQUEST message 35 from the MS 31. The GANC then validates the registration request. During this process, a Charging-CGI selector 52 determines a Charging-CGI and places it in the MS Context 46. Likewise, a Location-CGI selector 53 determines a Location-CGI and places it in the MS Context. The GANC then returns the Charging-CGI to the MS in the GA-RC REGISTER ACCEPT message 37.

When the GANC 33 receives the GA-CSR REQUEST message 38, the GANC extracts the Establishment Cause IE and provides it to a CGI selector 54. The CGI selector selects either the Charging-CGI or the Location-CGI based on the Establishment Cause IE. The Selected CGI is provided to an MSC interface 55 such as an A-interface. The interface sends a (BSSMAP) COMPLETE LAYER 3 INFORMATION message 40/44 to the MSC 34 and includes the Selected CGI and an initial Layer 3 message. The MSC may utilize the included Selected CGI for either PSAP routing or charging depending on information in the attached initial Layer 3 message.

If the communication to the core network is toward an SGSN instead of an MSC, the Gb-interface and Base Station Subsystem GPRS Protocol (BSSGP) are used to indicate the CGI to the SGSN. In BSSGP, a connection called BSSGP Virtual Connection (BVC) is established by the GANC to the SGSN and is used to identify a cell. When the BVC is established, the GANC indicates the CGI of the cell associated with the BVC. Thus, to indicate for example a Charging-CGI to the SGSN, the GANC selects a BVC associated with the selected Charging-CGI and then sends the BSSGP message on that BVC. Alternatively, the GANC may first create the BVC for the selected Charging-CGI, if it does not exist, and then send the BSSGP message to the SGSN on that BVC.

The present invention thus enables the use of different CGIs towards the MSC without any changes in the existing A-interface signaling. The invention also enables the differentiated handling of emergency calls and normal calls. Use of the Location-CGI enables the MSC/SGSN to route emergency calls to the correct PSAP. Use of the Charging-CGI enables the MSC/SGSN to apply the correct charging on all other calls and transactions.

In an alternative embodiment, the GANC recognizes that the Charging-CGI is used most often, and therefore the Charging-CGI is initially selected and sent to the MSC. If any services are subsequently activated for this subscriber that need location information on the CGI level, the Location-CGI is subsequently sent to the MSC. The MSC may request the GANC to send a Location-CGI, or the GANC may include logic that recognizes the need for location information and initiates the sending of the Location-CGI.

In another embodiment, the CN may initiate a trace invocation procedure towards the GANC to instruct the GANC to begin producing a trace record on an identified MS. For example, the MSC may initiate a trace invocation procedure by sending an MSC INVOKE TRACE message to the GANC. In the PS domain, the SGSN may initiate a trace invocation procedure by sending an SGSN-INVOKE-TRACE PDU to the GANC. If the CN initiates the trace invocation procedure, the GANC responds by including all available information in the trace. This means for example that the CANC includes both the Charging-CGI and the Location-CGI in the trace. The GANC may store or print out the Charging-CGI and Location-CGI in a local trace, or may send the trace to an Operational Support System (OSS).

Although multiple embodiments of the present invention have been described in the foregoing Detailed Description, it is understood that the invention is not limited to the embodiments disclosed, but is capable of numerous rearrangements, modifications, and substitutions without departing from the scope of the invention. For example, although the description discloses the GAN using the A-interface or Gb interface, the invention may also utilize other interfaces such as the Iu interface between a UTRAN and the CN. The invention is also applicable to systems such as CDMA2000 or Time Division-Synchronous CDMA (TD-SCDMA). The specification contemplates any modifications that fall within the scope of the invention defined by the following claims.

The invention claimed is:

1. A method of providing both location and charging information from a Generic Access Network (GAN) to a core network, said method comprising:
   determining by a GAN controller (GANC), a Charging Cell Global Identity (Charging-CGI) and a Location Cell Global Identity (Location-CGI) for a mobile station registering with the GANC, wherein the Charging-CGI provides charging information required for proper charging of a transaction by a mobile station, and the Location-CGI provides location information required for location-based services or routing of an emergency call from the mobile station to an emergency center;
   storing the Charging-CGI and the Location-CGI in a mobile station context;
   receiving from the mobile station, a request to establish a signaling connection, said request including an indication of a reason for the connection;
   selecting from the mobile station context, either the Charging-CGI or the Location-CGI based upon the reason for the connection; and
   sending the selected CGI to the core network in a message triggering a signaling connection.

2. The method according to claim 1, wherein the receiving step includes receiving a GA-CSR REQUEST message that includes an Establishment Cause information element (IE) wherein the Establishment Cause IE is selectively set by the mobile station to indicate either a normal call or an emergency call.

3. The method according to claim 1, wherein the determining step includes determining the Charging-CGI and the Location-CGI by analyzing in the GANC, information received from the mobile station and preconfigured information available in the GANC.

4. The method according to claim 3, wherein the preconfigured information is stored in the GANC.

5. The method according to claim 3, wherein the preconfigured information is stored in a separate database accessible by the GANC.

6. The method according to claim 3, wherein the preconfigured information includes information about the locations of Access Points in the GAN.

7. The method according to claim 3, wherein the preconfigured information includes information about the locations of Public IP addresses utilized by mobile stations during registration.

8. The method according to claim 3, wherein the determining step includes determining the Charging-CGI from information selected from a group consisting of:
   the mobile station's International Mobile Subscriber Identity (IMSI);
   the IMSI and an identifier of the access point (AP-ID) being utilized by the mobile station;
   the IMSI and a GMS EDGE Radio Access Network CGI (GERAN-CGI) reported by the mobile station; and
   the IMSI, GERAN-CGI, and a GERAN/UTRAN Coverage Indicator.

9. The method according to claim 3, wherein the determining step includes determining the Location-CGI from information selected from a group consisting of:
   a GMS EDGE Radio Access Network CGI (GERAN-CGI) reported by the mobile station;

the GERAN-CGI and a GERAN/UTRAN Coverage Indicator;

an identifier of the access point (AP-ID) being utilized by the mobile station;

a street address of the AP being utilized by the mobile station;

a Public IP-address for the mobile station; and geographical coordinates of the mobile station reported by the mobile station.

10. The method according to claim 1, wherein the sending step includes sending the selected CGI to a Mobile-services Switching Center (MSC) over a standard A-interface.

11. The method according to claim 1, wherein the sending step includes indicating the selected CGI to a Serving GPRS Support Node (SGSN) over a standard Gb-interface.

12. A Generic Access Network Controller (GANC) for providing both location and charging information from a Generic Access Network (GAN) to a core network, said GANC comprising:

means for determining a Charging Cell Global Identity (Charging-CGI) for a mobile station registering with the GANC, wherein the Charging-CGI provides charging information required for proper charging of a transaction by a mobile station;

means for determining a Location Cell Global Identity (Location-CGI) for the mobile station, wherein the Location-CGI provides location information required for location-based services or routing of an emergency call from the mobile station to an emergency center;

means for storing the Charging-CGI and the Location-CGI in a mobile station context;

means for receiving from the mobile station, a request to establish a signaling connection, said request including an indication of a reason for the connection;

means for selecting from the mobile station context, either the Charging-CGI or the Location-CGI based upon the reason for the connection; and means for sending the selected CGI to the core network in a message triggering a signaling connection.

13. The GANC according to claim 12, further comprising means for storing preconfigured information accessible by the means for determining the Charging-CGI and the means for determining the Location-CGI, wherein the Charging-CGI and the Location-CGI are determined by analyzing information received from the mobile station and the preconfigured information stored in the GANC.

14. The GANC according to claim 12, further comprising means for accessing preconfigured information stored in an external database accessible by the means for determining the Charging-CGI and the means for determining the Location-CGI, wherein the Charging-CGI and the Location-CGI are determined by analyzing information received from the mobile station and the preconfigured information stored in the database.

* * * * *

UNITED STATES PATENT AND TRADEMARK OFFICE
CERTIFICATE OF CORRECTION

PATENT NO. : 8,125,968 B2  
APPLICATION NO. : 12/279780  
DATED : February 28, 2012  
INVENTOR(S) : Nylander et al.

It is certified that error appears in the above-identified patent and that said Letters Patent is hereby corrected as shown below:

In Column 5, Lines 45-46, delete "procedure" and insert -- procedure, --, therefor.

In Column 7, Line 11, delete "thereof" and insert -- thereof) --, therefor.

In Column 7, Line 46, delete "received:" and insert -- received --, therefor.

Signed and Sealed this
Fourteenth Day of August, 2012

David J. Kappos
*Director of the United States Patent and Trademark Office*